July 2, 1946.  W. P. LEAR  2,403,099
CARGO HOIST
Filed May 15, 1944  5 Sheets-Sheet 2

FIG-2

INVENTOR.
WILLIAM P. LEAR
BY
*Richard A Marsen*
ATTORNEY

July 2, 1946.  W. P. LEAR  2,403,099
CARGO HOIST
Filed May 15, 1944  5 Sheets-Sheet 3

INVENTOR.
WILLIAM P. LEAR
BY
Richard A. Marsen
ATTORNEY

July 2, 1946.   W. P. LEAR   2,403,099
CARGO HOIST
Filed May 15, 1944   5 Sheets-Sheet 4

INVENTOR.
WILLIAM P. LEAR
BY Richard A. Marrs
ATTORNEY

Patented July 2, 1946

2,403,099

UNITED STATES PATENT OFFICE 2,403,099

CARGO HOIST

William P. Lear, North Hollywood, Calif., assignor, by mesne assignments, to Lear, Incorporated, Grand Rapids, Mich., a corporation of Illinois Application May 15, 1944, Serial No. 535,659

14 Claims. (Cl. 212—93)

This invention relates to a cargo handling unit which may be either power or manual driven, and more particularly to a novel compact lightweight cargo hoisting and traversing unit particularly suitable for use in cargo airplanes.

The development of relatively large cargo carrying airplanes has led to a demand for a compact lightweight cargo hoisting and traversing unit capable of handling relatively large loads. In particular, there is a demand for a cargo handling unit which is sufficiently light in weight that it will not appreciably affect the carrying capacity of the aircraft, and which is normally power driven but may be manually operated in the event of an emergency.

It is among the objects of this invention to provide a novel compact lightweight cargo handling unit, particularly suitable for use in cargo airplanes; to provide such a unit including hoisting and traversing drums and selectively operable mechanism for interconnecting the two drums for actuation as a unit; to provide a cargo hoisting unit including novel means for controlling the rate of lowering a load; to provide a cargo hoisting and traversing unit, particularly suitable for cargo airplanes, and which may be controlled from any point in the cargo carrying compartment of the airplane; to provide a cargo hoisting unit including novel means for controllably feeding the hoisting cable on to the hoisting drum; and to provide a cargo hoisting and traversing unit including simple and effective automatic remote controls.

These and other objects, advantages and novel features of the invention will be apparent from the following description, taken in connection with the accompanying drawings. In the drawings.

General operation

Figure 1:
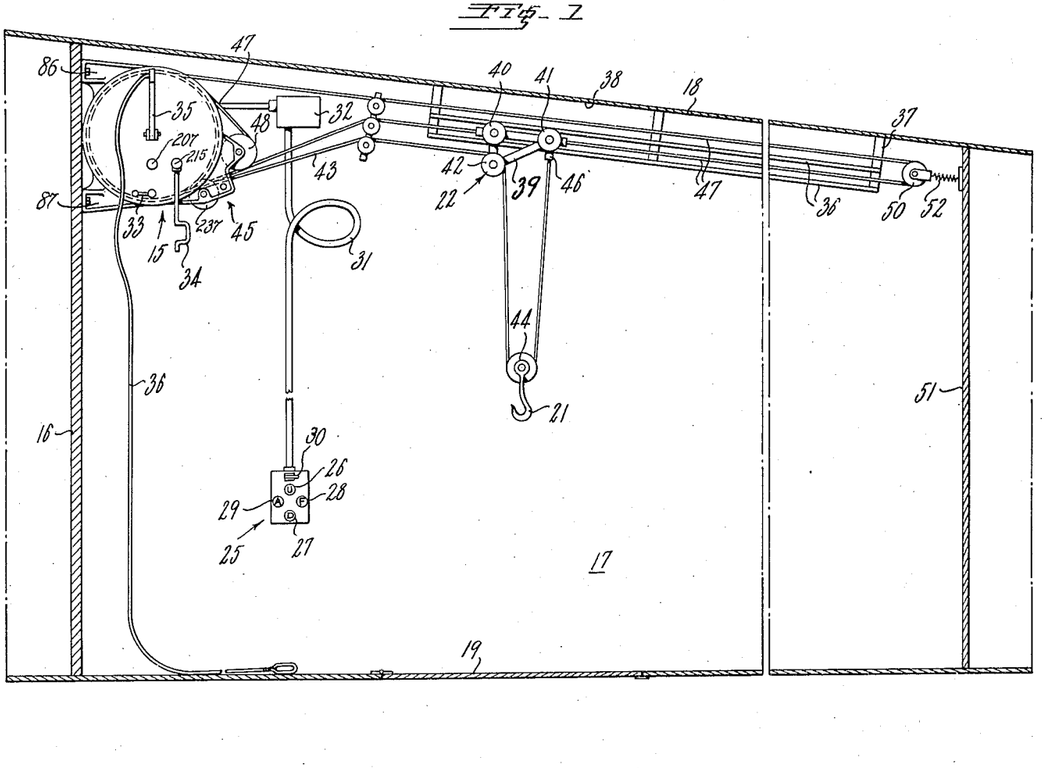
Fig. 1 is a longitudinal sectional view through the fuselage of a cargo aircraft, illustrating a typical installation of a cargo handling unit embodying the invention.

Referring to Fig. 1, the cargo handling unit of the invention comprises a compact lightweight traversing and hoisting unit 15 which may be secured to a forward bulkhead 16 of a cargo compartment 17 formed in the fuselage 18 of a cargo aircraft. Unit 15 includes a hoisting drum for raising and lowering a load which may be secured to a hoisting device, such as a hook 21, and a traversing drum for moving a traversing device, such as a trolley 22, longitudinally of the compartment 17 to distribute cargo loaded through trap door 19. Power operation of unit 15 is controlled by means of a control box 25 having a series of "up," "down," "forward" and "aft" push buttons, 26, 27, 28 and 29, respectively and a toggle control switch 30. Control box 25 is connected by multi-conductor cable 31 to a relay box 32 mounted on fuselage 18. Relay box 32 contains suitable relays operable by push buttons 26, 27, 28 and 29 for controlling the operation of unit 15 to either raise or lower hook 21 or to move the same forward and aft of cargo compartment 17.

In the event of failure of the power supply aboard the aircraft, or when otherwise desired unit 15 may be conditioned for manual operation by means of a gear shifting lever 33 and a detachable crank handle 34. When so conditioned, the rate of lowering of a load on hook 21 may be controlled by suitable mechanism operated by a brake handle 35 to which is attached a cable 36 sufficiently long to reach to any part of cargo compartment 17. Furthermore, cable 31 is likewise sufficiently long that control box 25 may be held in the hand of an operator standing in any part of the cargo compartment.

Trolley rails 36 are mounted in suitable brackets 37 secured to the roof 38 of the cargo compartment, and support trolley 22. Trolley 22 includes a frame 39 having trolley wheels 40 and 41 operable on rails 36, and a pulley 42. The hoisting cable 43 is secured at one end to the hoisting drum and fed on to and off of the drum by a cable spooling mechanism 45. Mechanism 45 maintains tension on cable 43 during the time that the same is being wound on the hoisting drum, and also properly distributes the cable lengthwise of the drum. Cable 43 passes over pulley 42 and around a pulley 44 secured to hook 21 and is fastened at its opposite end 46 to trolley 22. The traversing cable 47 is in effect, an endless cable passing one or more times around the traversing drum and around a transfer pulley 48 associated therewith. Cable 47 likewise passes around a pulley 50, which is secured to the rear bulkhead 51 of the cargo compartment by a spring 52, and its opposite ends are secured to either end of trolley 22. Spring 52 maintains tension on cable 47 at all times.

The hoisting and traversing drums are substantially equal in diameter. With the arrangement thus far described, if the traversing drum, and thus trolley 22, are held stationary, rotation of the hoisting drum will raise or lower hook 21 depending upon the direction of rotation. If the two drums are coupled together for operation as a unit, rotation thereof will cause movement of trolley 22 along rails 36 forward and aft of cargo compartment 17. As hoisting cable 43 is paid out or drawn in at the same rate as traversing cable 47, hook 21 will remain constant in position with respect to trolley 22. The arrangement of the hoisting and traversing cables with respect to trolley 22 is substantially the same as that described and claimed in my copending application Serial No. 506,797, filed October 19, 1943, for "Traversing hoist."

*Construction of traversing and hoisting unit*

The internal arrangement and operation of traversing and hoisting unit 15 will now be described in detail with particular reference to Figs. 2 to 5. The unit includes a frame 55 on which a hoisting drum 60 and a traversing drum 65 are mounted. Frame 55 comprises an inner member 56 having an outer cylindrical bearing surface rotatably supporting drums 60 and 65. End plates 57 and 58 are secured to member 56, and an outer sheath or casing 61 is disposed therearound, except for openings through which cables 43 and 47 pass.

Figure 2:
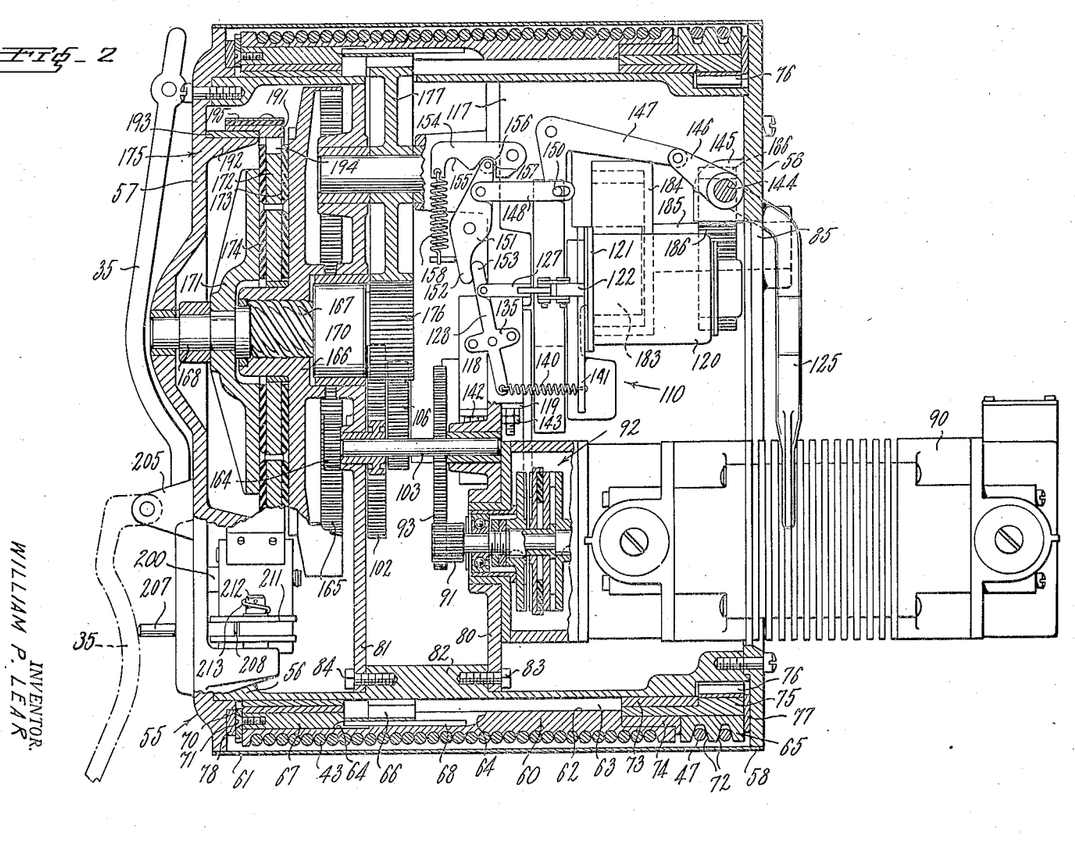
Fig. 2 is a longitudinal sectional view of the cargo handling unit shown in Fig. 1.

Drum 60 is formed with an inner cylindrical surface 62 engaging bearing 63 on member 56, and with recess portions 64 in which are secured an internal ring gear 66 and a sleeve 67. Keys 68 maintain gear 66 and sleeve 67 against rotation with respect to drum 60. A spur gear 70 having a diameter substantially equal to that of drum 60, is secured to sleeve 67 by screws 71, and drives spooling mechanism 45. The outer surface of drum 60 is spirally grooved to receive hoisting cable 43.

Traversing drum 65 has an outer surface formed with a pair of grooves 72 in which is disposed hoisting cable 47. Bearings 73 and 74 are disposed, respectively, between member 56 and drum 60 and a sleeve 75 to which drum 65 is secured. On the inner surface of sleeve 75, an internal ring gear 76 is secured. A bearing 77 is disposed between the outer edge of drum 65 and end plate 58, and a similar bearing 78 is disposed between gear 71 and end plate 57.

Supporting brackets 80 and 81 extend across member 56 and are secured to shoulder 82 thereon by screws 83 and 84. End plate 58 is formed with a large aperture 85, as shown more clearly in Fig. 5, and with supporting brackets 86 and 87 by which unit 15 may be secured to bulkhead 16.

The driving means for unit 15 comprises a motor 90 secured to bracket 80, and driving a pinion 91 through a torque limiting clutch arrangement 92. The motor is disposed partly within housing 55 and partly beyond plate 58. Pinion 91 is adapted to mesh with a spur gear 93 which is mounted for swinging movement on a bracket 94 (see Fig. 4) pivoted about the axis of a spur gear 95 with which spur gear 93 continually meshes. A crank 96 connects one end of bracket 94 to a rod 97 associated with the gear shifting mechanism including lever 33 previously referred to. Through the medium of lever 33, crank 96 and bracket 94, spur gear 93 may be moved from a position where it normally engages pinion 91 to a manual operating position wherein it engages a spur gear 98 which is operated by crank 34 in a manner to be described more fully hereinafter.

Spur gear 95 is mounted on a shaft 100 on the other end of which are a pinion 101 and a speed governor 105, which latter will be described more fully hereinafter in connection with Fig. 11. Pinion 101 meshes with a spur gear 102 connected through a shaft 103 to driving mechanism for hoist drum 60. Secured to gear 102 is a pinion 104 meshing with a pinion 106 on a shaft 107 which connects driving mechanism for unit 15 to a selectively operable mechanism 110 which is adapted to condition unit 15 for either hoisting or traversing operations.

Mechanism 110 includes a spider 108 on which are rotatably mounted a plurality of planetary pinions 111 engaging an internal ring gear 112 having an outer braking surface 113. Planetary pinions 111 are also in continual engagement with central pinion 114 on a shaft 115, to which is secured a brake drum 116 substantially equal in diameter to ring gear 112. Shaft 115 connects selectively operable mechanism 110 to the driving mechanism for traversing drum 65.

Figure 3:
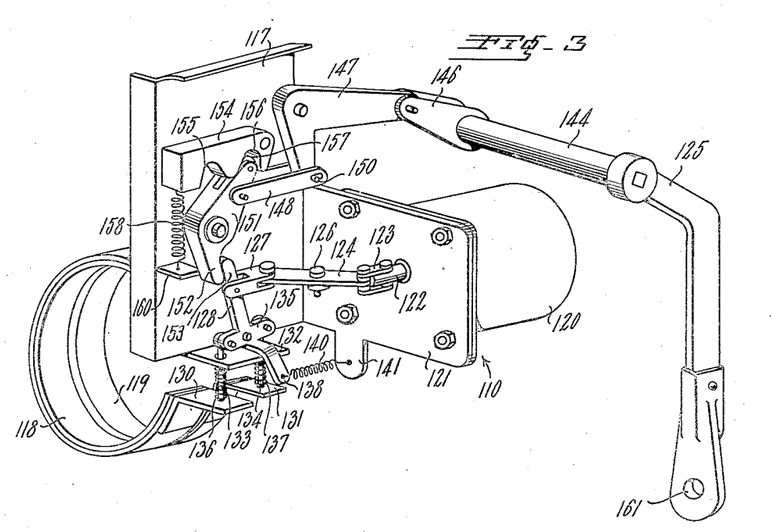
Fig. 3 is a perspective view of a selectively operable control mechanism forming part of the invention.

The other cooperating parts of selectively operable mechanism 110 are shown in perspective in Fig. 3. Mechanism 110 is mounted on a bracket 117 secured to bracket 80 and to member 56 of frame 55. The mechanism includes a pair of brake bands 118 and 119 cooperating respectively with the braking surface 113 and brake drum 116. The bands are arranged for alternate braking engagement, and normally band 119 engages brake drum 116 to maintain traversing drum 65 stationary.

Selectively operable means are provided for effecting disengagement of brake band 119 from drum 116 and engagement of brake band 118 with braking surface 113. Such selectively operable means comprises a solenoid 120 and a manual operating lever 125. Solenoid 120 is secured to a bracket 121 forming part of bracket 117, and its plunger 122 is connected by a link 123 to one end of a lever 124 pivoted at 126 to bracket 121. A doubly forked link 127 connects the other end of link 124 to the upper end of a T-shaped operating arm 128 for brake bands 118 and 119.

Brake bands 118 and 119 are formed with projecting ears 130 and 131 which are free to move. A plate 132 extends horizontally from bracket 117 and is provided with a pair of apertures through which extend pins 133 and 134 secured at their lower ends to ears 130 and 131, respectively. The upper ends of the pins are pivotally connected to each end of a cross arm 135, forming part of operating arm 128, and springs 136 and 137 surround the pins and normally urge ears 130 and 131 downwardly with respect to bracket 132. Arm 128 is provided with an extension 138 connected by a tension spring 140 to an extension 141 of bracket 121. Spring 140 normally biases arm 128 to the position shown in Fig. 3, wherein pin 133 is held downwardly and pin 134 is held in an upward position, thus releasing brake band 118 from braking surface 113 and clamping brake band 119 against brake drum 116. Adjusting nuts 142 and 143 (Fig. 2) are provided for adjusting the brake bands with respect to the braking surface 113 and brake drum 116.

In the event of failure of the power supply to unit 15, manual operating lever 125 is operable to effect manual operation of device 110. Referring to Figs. 2 and 3, lever 125 is secured to one end of a shaft 144 rotatably mounted in a bracket 145 formed on end plate 58. On the opposite end of shaft 144 is an arm 146 pivotally connected to one arm of a crank 147 pivoted on bracket 117. A link 148 has a longitudinal slot engaging a pin 150 mounted in the opposite end of crank 147. The pin and slot constitute a lost motion arrangement providing for power actuation of device 110 without affecting the position of lever 125.

The other end of link 148 is pivotally connected to an intermediate point of a lever 151 pivoted on bracket 117. The lower end 152 of lever 151 engages the upper end 153 of operating arm 128 for brake bands 118 and 119. A latching block 154 is pivotally mounted on bracket 117 and has a pair of latching recesses 155 and 156 cooperative with a roller 157 rotatably mounted in the forked upper end of lever 151. A spring 158 is connected between the outer end of block 154 and a plate 160 secured to bracket 117, and biases block 154 into a latching position.

The outer end of lever 125 is provided with an eye 161 to which a cable or other suitable operating means may be secured for operation of the manual mechanism from a point remote from unit 15. Normally, mechanism 110 is in the position shown in Fig. 3. Upon outward movement of arm 125, lever 151 moves arm 128 clockwise to release brake band 119 from brake drum 116, and to clamp brake band 118 against brake surface 113. Arm 151 is releasably latched in such position due to its roller engaging in recess 155 of latch block 154.

The driving arrangement for hoist drum 60 will now be described with particular reference to Figs. 2 and 4. A pinion 164 on the outer end of shaft 103 meshes with an internal ring gear 165 having an internally threaded hub 166 engaging a threaded portion 167 of a shaft 168 mounted at its inner end in a bearing 170 forming part of bracket 81 and at its outer end in a bearing in end plate 57. Adjacent hub 166, a braking disk 171 is keyed to shaft 168. Disposed between ring gear 165 and disk 171 is a disk 172 provided with braking surfaces 173 and 174 respectively cooperable with gear 165 and disk 171.

Disk 172 forms part of an overrunning clutch and brake arrangement 175, which will be described hereinafter with particular reference to Figs. 6 and 7. On the inner end of shaft 168 is a pinion 176 which meshes with a spur gear 177 engaging internal ring gear 66 secured to drum 60. When motor 90 is energized, ring gear 165 tends to move to the left along portion 167, due to its threaded engagement therewith, and disk 172 is clamped between gear 165 and disk 171. Disk 171 is keyed to shaft 168 and thus the shaft is caused to rotate as a unit with gear 165. Through gears 176 and 177, drum 60 is rotated in a direction to draw in cable 43 and hoist the load attached to hook 21. Operation of these elements during a lowering operation will be described in connection with Figs. 6 and 7.

The driving arrangement for traversing drum 65 includes a pinion 180 on the outer end of shaft 115 which meshes with a spur gear 181 on shaft 182. On the outer end of shaft 182 is a pinion 183 which meshes with an internal ring gear 184 on a shaft 185 on the other end of which is a spur gear 186 which engages ring gear 76 secured to drum 65.

Normally, selectively operable mechanism 110 is conditioned to cause brake band 119 to engage brake drum 116 maintaining traversing drum 65 stationary. Under such conditions, operation of motor 90 to rotate hoisting drum 60 will cause spider 108 to rotate, and planetary pinions 111 will simply roll around central pinion 114 and effect free rotation of internal ring gear 112. When solenoid 120 is energized, or when handle 125 is swung counter-clockwise, brake band 118 is clamped against surface 113 and brake band 119 is released from brake drum 116. When motor 90 is energized or when crank handle 34 is operated, with ring gear 112 held stationary, rotation of spider 108 will cause pinions 111 to rotate around gear 112 and drive pinion 114. This in turn drives shaft 115 connected to the driving mechanism for traversing drum 65.

*Overrunning clutch and brake*

Figure 6:
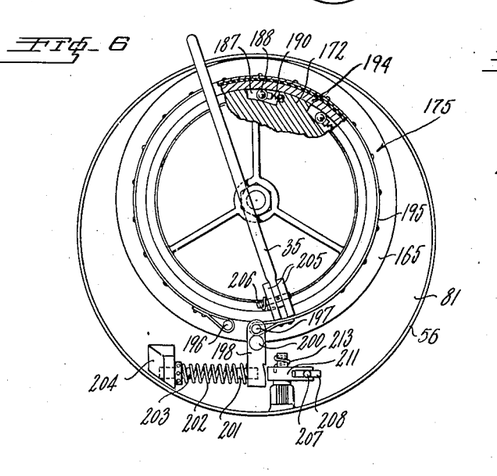
Fig. 6 is an elevation view of the opposite end of the unit, with the end plate removed.
Figure 7:
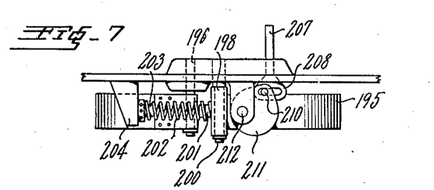
Fig. 7 is a bottom plan view of a portion of Fig. 6.

The overrunning clutch and brake arrangement 175 is illustrated in further detail in Figs. 6 and 7. Disk 172 is formed with peripheral generally trapezoidal notches or slots 187 in which are disposed ball bearings 188 normally biased by springs 190 to the narrower portion of slots 187. A brake drum 191 (Fig. 2) is movably mounted on an annular rib 192 formed on the inside of end plate 57 through the medium of bearing 193. Drum 191 is provided with an inwardly extending rib 194 engaging the outer periphery of disk 172 and enclosing the outer sides of slots 187. Drum 191 is normally held against rotation by a brake band 195 having one end fixedly secured by pin 196 to end plate 57. The other end of brake band 195 is fastened around a pin 197 on one end of an arm 198 pivotally mounted on a pin 200 secured to end plate 57. The other end of arm 198 is provided with an abutment 201 forming a seat for a spring 202 which, at its opposite end, surrounds an abutment 203 on a bracket 204 secured to member 56. Spring 202 normally urges arm 198 in a counter-clockwise direction, as viewed in Fig. 6, clamping band 195 tightly around drum 191 and effectively restraining movement thereof.

When motor 90 is energized in a direction to cause rotation of drum 60 for a hoisting movement, disk 172 rotates counter-clockwise, as viewed in Fig. 6, and balls 188 move toward the larger end of slots 187, against the force of springs 190, providing for rotation of disk 172 with respect to brake drum 191. As previously explained, under such conditions, gear 165 moves to the left along threaded portion 167 of shaft 168 to clamp disk 172 between itself and disk 171 which is keyed to shaft 168. During a lowering operation, motor 90 drives gear 165 in such a direction that it tends to move to the right along threaded portion 167 releasing itself and disk 171 from engagement with the brake surfaces 173 and 174, respectively, of disk 172. Should the load tend to rotate faster than the speed determined by the speed of rotation of motor 90, shaft 168 will turn, relative to gear 165, in such a direction that gear 165 will tend to move to the left, as viewed in Fig. 2, to clamp disk 172 between itself and disk 171. This will tend to cause rotation of disk 172 in a clockwise direction, as viewed in Fig. 6. Balls 188 will thereupon be urged to the narrower portion of slots 187 clamping disk 172 against movement with respect to brake drum 191. These effects tend to counterbalance each other during a lowering operation providing for the load to be lowered at a controlled rate.

*Manual operation of traversing and hoisting unit*

When traversing and hoisting unit 15 is conditioned for manual operation, means are provided whereby the load may be lowered at a controlled rate through actuation of brake band 195. Such means comprises lever 35 which is pivotally mounted at its lower end between apertured ears 205 formed on the outer surface of end plate 57. A spring 206 normally maintains lever 35 in the upper position shown in Figs. 1, 2 and 6. When the lever is swung to the lower position shown in dotted lines in Fig. 2, it engages a pin 207 slidably mounted through plate 57 and having a slotted inner end 208 engaging a pin 210 on a cam 211. Cam 211 is pivotally mounted on a pin 212 and a coil spring 213 normally urges cam 211 to a position where it is out of engagement with the lower end of arm 198. When lever 35 engages pin 207, it rotates cam 211 clockwise, as viewed in Fig. 7, to engage arm 198 and swing this arm in a clockwise direction compressing spring 202. This releases brake band 195 from engagement with brake drum 191. The load is then free to drop under the influence of gravity, being controlled by suitable operation of lever 35 to effect engagement and disengagement of brake band 195. Such lowering movement is, however, further controlled by speed governor 100 described more fully hereinafter.

Figure 4:
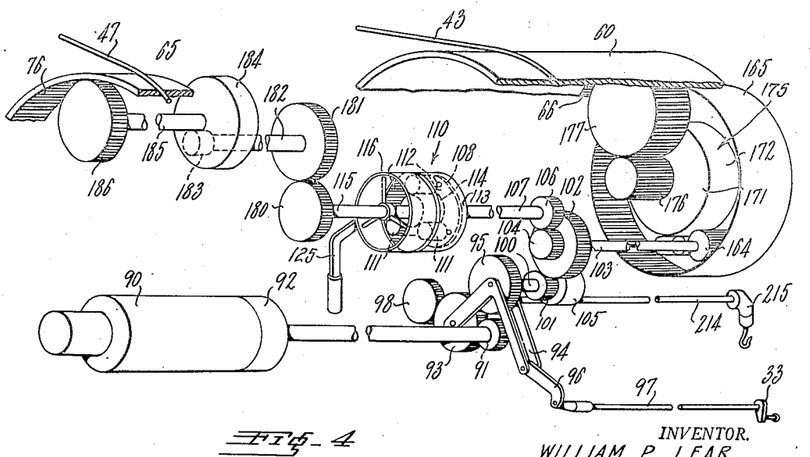
Fig. 4 is a horizontally exploded schematic view of the cargo handling unit of the invention.
Figure 8:
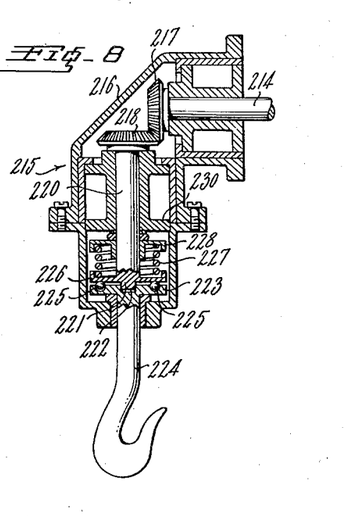
Fig. 8 is a longitudinal sectional view through a torque limiting arrangement forming part of a manual drive.

The manual means for raising and lowering hook 21 and for traversing trolley 22 is illustrated particularly in Figs. 4 and 8. This means includes a shaft 214 connected to a torque limiting angle drive 215. Drive 215 is mounted in a housing 216. Shaft 214 is provided with a bevel gear 217 engaging a bevel gear 218 on a vertically disposed shaft 220 having a squared lower end 221 adapted to cooperate with a similar shaped recess 222 in a flange 223 formed on the upper end of a hook 224. Hook 224 is adapted to have crank 34 detachably secured thereto. Flange 223 is provided with a plurality of tapered recesses in its upper face, in which are mounted ball bearings 225 which are disposed between flange 223 and a cup-shaped flange 226 formed on the lower end of shaft 220. A spring 227 is disposed between flange 226 and a similar flange 228 which is slidably and rotatably mounted on shaft 220.

Sliding movement of cup-shaped flange 226 is limited by engagement of the flange with a bearing 230 formed in housing 216. If the torque transmitted through hook 224 exceeds a preselected amount, balls 225 move out of the deeper portion of their tapered recesses to urge flange 226 upwardly, compressing spring 227. Such upward movement moves squared end 221 of shaft 220 out of engagement with recess 222, thus effecting disengagement of hook 224 and shaft 220. This arrangement effectively limits the torque which can be applied through the manual driving arrangement to a safe value predetermined in accordance with the design of unit 15. In order to condition the unit for such manual operation, operating arm 33 must be moved in a direction to actuate arm 94 to swing gear 93 into meshing engagement with gear 95 secured to shaft 214 of the manual driving arrangement 215.

*Cable spooling mechanism*

Figure 5:
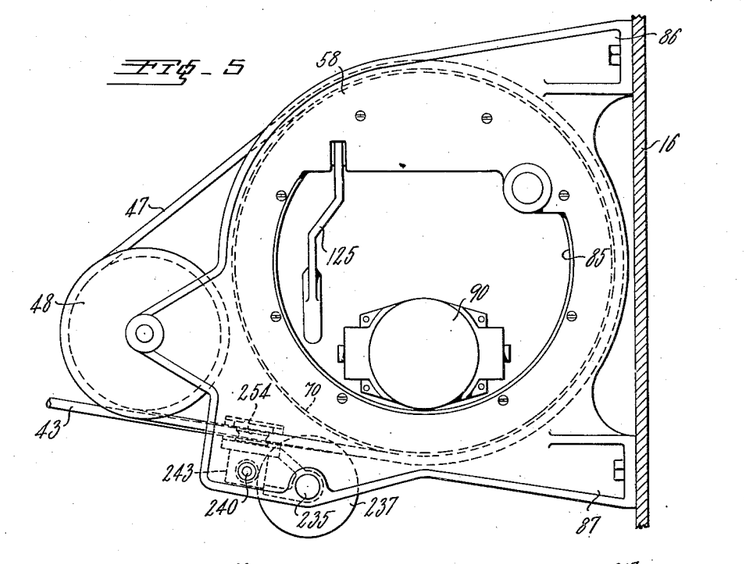
Fig. 5 is an elevation view of one end of the unit.
Figure 9:
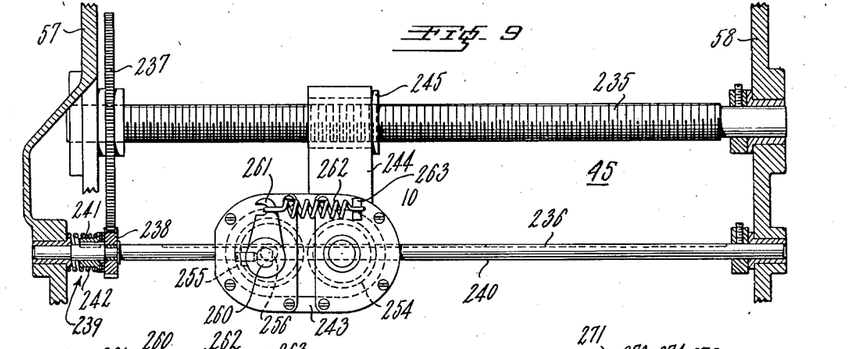
Fig. 9 is a plan view, partly in section, of a cable spooling mechanism embodying the invention.
Figure 10:
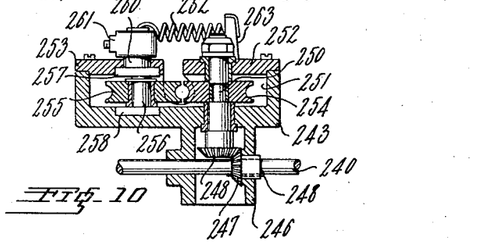
Fig. 10 is a longitudinal sectional view of a portion of Fig. 9.

Figs. 5, 9 and 10 illustrate cable spooling mechanism 45 for properly feeding cable 43 to hoist drum 60. This arrangement comprises a threaded shaft 235 and a driving shaft 240, both rotatably mounted in bearings in end plates 57 and 58. Shaft 240 is provided with a keyway 236. A gear 237, secured to shaft 235, meshes with gear 70 secured to drum 60 and with a pinion 238 rotatably mounted on shaft 240. Pinion 238 is coupled to shaft 240 through the medium of a one way ratchet clutch 239 having a hub member 241 keyed to shaft 240 and normally held by a spring 242 in a position wherein shaft 238 is effectively coupled to shaft 240.

The hoist cable spooling mechanism includes a housing 243 having an arm 244 extending at right angles thereto and provided with an apertured end through which shaft 235 extends. A nut 245 fixed in such apertured end has threaded engagement with shaft 235, whereby rotation of shaft 235 will move housing 243 longitudinally of shafts 235 and 240. A vertical extension 246 is formed on housing 243 and is provided with apertures through which extends shaft 240. A bevel gear 247 is mounted in this extension, and is provided with a key 248 slidably engaging keyway 236. Gear 247 meshes with a bevel gear 248 on the lower end of a vertical shaft 250.

Housing 243 is provided with a recess 251 closed by cover plates 252 and 253. A grooved pulley 254 is mounted in recess 251 and secured for rotation with shaft 250. Cooperating with pulley 254 is a pulley 255 mounted on a pin 256. Pin 256 is eccentrically mounted between upper and lower circular plates 257 and 258 secured to a shaft 260 on the upper end of which is an arm 261. A spring 262 extends between arm 261 and a bracket 263 and normally urges arm 261 in a direction to move pulley 255 into clamping engagement with hoist cable 43 as it passes between this pulley and pulley 254.

The operation of the cable spooling mechanism is as follows. During rotation of hoist drum 60 in a direction to draw in cable 43, shaft 235 is likewise rotated through the medium of gears 70 and 237. This moves spooler housing 243 longitudinally of drum 60 to properly dispose the cable thereon. When unit 15 is operating in a hoisting direction, one-way ratchet clutch 239 is effective to release pinion 238 from driving connection with shaft 240. Cable 43 is pulled between pulleys 254 and 255, being held under tension by spring 262 urging pulley 255 towards pulley 254. When cable 43 is being unwound from drum 60 during a lowering operation, shaft 235 likewise moves spooler housing 243 longitudinally of drum 60 to properly feed the cable off the drum. During such lowering operation, one-way ratchet clutch 239 effectively couples pinion 238 to drive shaft 240. The gearing ratio is such that the peripheral speed of pulley 254 is greater than the speed with which cable 43 is paid off the drum. Thus, cable 43 is kept under tension between drum 60 and spooling arrangement 45.

Speed governor

Figure 11:
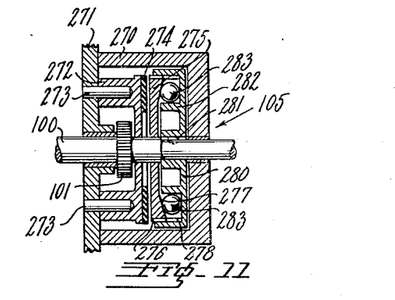
Fig. 11 is a cross-sectional view of a speed governing mechanism embodied in the invention.

Speed governing device 105 is illustrated in Fig. 11. The device comprises a housing 270 secured to a bracket 271 mounted inside frame 55. Shaft 100 extends through the housing and bracket and is supported on bearings therein, with gear 101 being disposed within the housing. An annular brake support 272 is mounted on pins 273 secured to bracket 271, and provided with a braking surface 274. Rotatably mounted on shaft 100 adjacent braking surface 274 is a braking disk 275 having teeth 276 around its outer periphery. Disk 275 progressively increases in thickness from a point midway its center and its periphery to the periphery, to form a wedge portion as indicated at 277. Teeth 276 mesh with teeth 278 on an internal ring gear 280 secured to rotate with shaft 100 by a key 281. Ring gear 280 is provided with an annular flange 282 extending towards disk 275. A plurality of ball bearings 283 are mounted in the recess provided by wedge portion 277 of disk 275 and flange 282 of gear 280.

The speed governing arrangement operates in the following manner. Rotation of shaft 100 rotates ring gear 280 and, through inter-engagement of teeth 276 and 278, disk 275 rotates therewith. When the speed of shaft 100 reaches or exceeds a predetermined value, balls 283 move outward under the influence of centrifugal force and, due to wedge portion 277 of disk 275, urge this disk toward braking surface 274. This effects a braking action on shaft 100 and associated connected parts until such time as the speed drops below the predetermined value. Device 105 is effective to limit the speed of rotation of the elements connected to the drums in both directions of rotation, irrespective of whether unit 15 is manually or power operated.

Electric control circuit for the system

Figure 12:
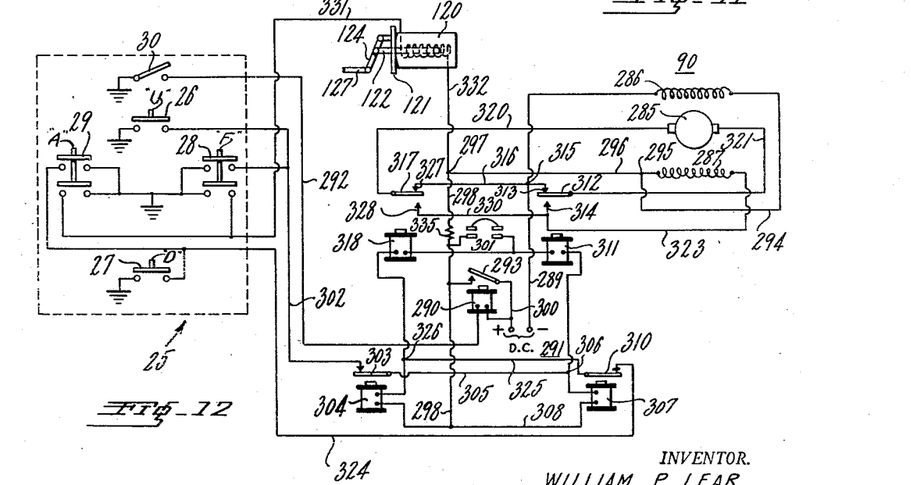
Fig. 12 is a schematic wiring diagram illustrating control circuits forming part of the invention.

A schematic wiring diagram illustrating a control arrangement for the cargo hoist unit is shown in Fig. 12. As described hereinabove, power operation of traversing and hoisting unit 15 through motor 90 and mechanism 110 is controlled by a control box 25 small in size that may be carried in the hand of an operator. Motor 90 comprises an armature 285, a shunt field winding 286 and a series field winding 287. Box 25 includes "up" and "down" push buttons 26 and 27, respectively, "forward" and "aft" push buttons 28 and 29, respectively, and main control switch 30. Closure of switch 30 energizes a main control relay 290 from a source of direct current 291 through a conductor 292. Relay 290 operates its armature 293 to connect one terminal of source 291 to the system, thus conditioning the same for operation. Shunt field winding 286 is thereby continuously energized, for a purpose to be described, over the following circuit: negative terminal of source 291, conductor 289, shunt field winding 286, conductor 294, junction point 295, conductor 296, junction point 297, conductor 298, armature 293 and the positive terminal of source 291.

When "up" push button 26 is depressed, a circuit is closed as follows: push button 26, conductor 302, armature 303 of interlock relay 304, conductor 305, junction point 306, interlock relay 307, conductor 308, conductor 298, relay armature 293 and the positive terminal of source 286. Relay 307, when energized, moves its armature 310 to break the control circuit for "down" push button 27 and "aft" push button 29. This interlocking arrangement guards the system against damage due to accidental depression of two or more push buttons at the same time. Push button 26 also closes a circuit through "up" relay 311, which is the same as the circuit previously described as far as junction point 306. One terminal of relay 311 is connected to junction point 306 and the other terminal is connected to battery through thermal cut-out 301, conductor 298 and relay armature 293. When energized, "up" relay 311 disengages its armature 312 from contact point 313 and engages it with contact point 314.

Motor armature 285 is thereby connected in parallel with shunt field winding 286 over the following circuit: junction point 315 in conductor 289, conductor 316, armature 317 of "down" relay 318, conductor 320, motor armature 285, conductor 321, relay armature 312, contact point 314, conductor 323, series field winding 287 and junction point 295; the remainder of the circuit being the same as that for shunt field winding 286. Motor 90 is thus energized to rotate hoist drum 60 in the direction to wind up hoist cable 43 thereon.

When the load has been raised to the desired level, push button 26 is released. This deenergizes relays 307 and 311, with the armatures 310 and 312 of these relays assuming the positions shown in Fig. 12. Relay armatures 312 and 317 thereby complete a short circuit including motor armature 285, while shunt field winding 286 remains continually energized, as described. The result of the short circuiting of motor armature 285 with the continued energization of shunt field winding 286 is to effect dynamic braking of motor 90, bringing the system connected thereto to a substantially instantaneous stop. Motor 90 is designed so that no serious overheating of shunt field winding 286 will occur during the normal operating conditions of the system, if such field winding is continuously energized.

When "down" push button 27 is closed, it energizes interlocking relay 304 over a circuit including conductor 324, armature 310 of relay 307, conductor 325, junction point 326, relay 304, conductor 298 and relay armature 293. Relay 304 opens its armature 303 preventing closing of the "up" circuit through push button 26. At the same time, relay 318 is energized over a circuit from junction point 326 through relay 318, thermal cut-out 301 and conductor 298 and relay armature 293. Relay 318 disengages its armature 317 from contact point 327 and engages it with contact point 328.

Under such conditions, armature 285 and series field winding 287 are energized for rotation of the motor in a reverse direction over the following circuit: conductor 289, junction point 315, relay armature 312, conductor 321, motor armature 285, conductor 320, relay armature 317, contact point 328, conductor 330, conductor 323, series field winding 287, conductor 296, conductor 298 and relay armature 293. The motor is thus energized for rotation in a direction to unwind cable 43 from drum 60. When push button 27 is released, a dynamic braking circuit for motor 90 is completed in the same manner as previously described.

When it is desired to traverse trolley 22 in a forward direction, push button 28 is depressed. Depression of push button 28 closes the "up" energizing circuit previously described, and also closes a parallel circuit through solenoid 120 of selectively operable mechanism 110 as follows: conductor 331, solenoid 120, conductor 332, conductor 298 and relay armature 283. As previously described, energization of solenoid 120 conditions the unit for connection of hoist drum 66 and traversing drum 65 for operation together, thus effecting forward movement of trolley 22.

Similarly, depression of "aft" push button 29 completes the "down" circuit previously described, and also the same parallel circuit previously described through solenoid 120. This effects connection of drums 66 and 65 for operation as a unit thus effecting rearward or aft movement of trolley 22. Upon release of either the "forward" or "aft" push buttons, a dynamic braking circuit for motor 90 is completed in the same manner as previously described.

It will be noted that a heating resistance 335 is connected in conductor 298. Resistance 335 is juxtaposed with thermal cutout unit 301. Should motor 90 become overloaded, the heating effect of resistance 335 will cause opening of thermal cutout 301 which in turn breaks the energizing circuits for relays 311 and 313, thus effecting stopping of the motor. This is a safety feature to prevent damage to the motor.

The described device is a compact lightweight unit completely self-contained and which may be installed at a convenient point in the cargo compartment of a freight carrying airplane. Due to the provision of the relatively long connection cable 31 and the push-button control device 25, operation of system may be readily controlled from any point in the cargo compartment. Similarly, lowering and aft movement of the device may be manually controlled from any point in the cargo compartment through cable 36 connected to lever 35. The device may be conditioned for either manual or power operation by simply throwing gear shift lever 33 in one direction or the other. Additionally, speed control means are provided for limiting the rate of operation of the mechanism in either a hoisting or lowering operation, irrespective of whether the unit is manually or power actuated. A further feature is the provision of the torque limiting mechanism in the manual drive whereby a torque greater than a predetermined limit may not be imposed on the mechanism. The lowering speed governing mechanism of the invention forms the subject matter of my copending divisional application Serial No. 625,497, filed October 30, 1945, for "Release control for hoisting apparatus."

While a specific embodiment of the invention has been described in detail for the purpose of illustrating the application of the principles thereof, it will be understood that the invention may be otherwise embodied without departing from such principles.

What is claimed is:

1. A traversing hoist comprising, in combination, a hoisting drum; a traversing drum; a traversing device; a hoisting device mounted on said traversing device; cables connecting said hoisting and traversing drums to said hoisting and traversing devices, respectively; power driving means; manual driving means; planetary gearing interconnecting said drums; means selectively operable to connect either of said driving means to said planetary gearing; mechanism operatively associated with said planetary gearing and effective to condition the same either to interconnect said drums or to hold said traversing drum stationary; manual means for selectively operating said mechanism to connect said drums for operation as a unit; other means for selectively operating said mechanism; a torque limiting mechanism interposed between said power driving means and said selectively operable means; and a torque limiting mechanism incorporated in said manual driving means.

2. A traversing hoist comprising, in combination, a frame; a hoisting drum rotatably mounted on said frame; a traversing drum rotatably mounted on said frame; an electric motor secured to said frame; a first internal ring gear rotatable with said hoisting drum; a second internal ring gear rotatable with said traversing drum; a pinion engaging said first ring gear; planetary gearing having a first element and a second element; a lowering speed controlling device connecting said first element to said pinion; gear means connecting said second element to said second ring gear; means selectively operable to connect said motor to said first element; and mechanism selectively operable either to drivingly interconnect said elements to connect said drums for rotation as a unit, or to hold said second element stationary to restrain movement of said traversing drum.

3. A traversing hoist comprising, in combination, a frame; a hoisting drum rotatably mounted on said frame; a traversing drum rotatably mounted on said frame; an electric motor secured to said frame; a first internal ring gear rotatable with said hoisting drum; a second internal ring gear rotatable with said traversing drum; a pinion engaging said first ring gear; planetary gearing having a first element and a second element; a lowering speed controlling device connecting said first element to said pinion; gear means connecting said second element to said second ring gear; means selectively operable to connect said motor to said first element; mechanism selectively operable either to drivingly interconnect said elements to connect said drums for rotation as a unit, or to hold said second element stationary to restrain movement of said traversing drum; solenoid means for selectively operating said mechanism; and manual means for selectively operating said mechanism to connect said drums for operation as a unit.

4. A traversing hoist comprising, in combination, a frame; a hoisting drum rotatably mounted on said frame; a traversing drum rotatably mounted on said frame; an electric motor secured to said frame; manual driving means detachably secured to said frame; a first internal ring gear rotatable with said hoisting drum; a second internal ring gear rotatable with said traversing drum; a pinion engaging said first ring gear; planetary gearing having a first element and a second element; a lowering speed controlling device connecting said first element to said pinion; gear means connecting said second element to said second ring gear; gear shifting means selectively operable to connect either said electric motor or said manual driving means to said planetary gearing; and mechanism selectively operable either to drivingly interconnect said elements to connect said drums for rotation as a unit or to hold said second element stationary to restrain movement of said traversing drum.

5. A traversing hoist comprising, in combination, a frame; a hoisting drum rotatably mounted on said frame; a traversing drum rotatably mounted on said frame; an electric motor secured to said frame; manual driving means detachably secured to said frame; a first internal ring gear rotatable with said hoisting drum; a second internal ring gear rotatable with said traversing drum; a pinion engaging said first ring gear; planetary gearing having a first element and a second element; a lowering speed controlling device connecting said first element to said pinion; gear means connecting said second element to said second ring gear; gear shifting means selectively operable to connect either said electric motor or said manual driving means to said planetary gearing; mechanism selectively operable either to drivingly interconnect said elements to connect said drums for rotation as a unit or to hold said second element stationary to restrain movement of said traversing drum; solenoid means for selectively operating said mechanism; and manual means for selectively operating said mechanism to connect said drums for operation as a unit.

6. A traversing hoist comprising, in combination, a frame; a hoisting drum rotatably mounted on said frame; a traversing drum rotatably mounted on said frame; an electric motor secured to said frame; manual driving means detachably secured to said frame; a first internal ring gear rotatable with said hoisting drum; a second internal ring gear rotatable with said traversing drum; a pinion engaging said first ring gear; planetary gearing having a first element and a second element; a lowering speed controlling device connecting said first element to said pinion; gear means connecting said second element to said second ring gear; gear shifting means selectively operable to connect either said electric motor or said manual driving means to said planetary gearing; mechanism selectively operable either to drivingly interconnect said elements to connect said drums for rotation as a unit or to hold said second element stationary to restrain movement of said traversing drum; solenoid means for selectively operating said mechanism; manual means for selectively operating said mechanism to connect said drums for operation as a unit; a brake normally engaging said speed controlling device to control the rate of lowering said hoisting device; and manual means selectively operable to release said brake.

7. A traversing hoist comprising, in combination, a frame; a hoisting drum rotatably mounted on said frame; a traversing drum rotatably mounted on said frame; an electric motor secured to said frame; manual driving means detachably secured to said frame; a first internal ring gear rotatable with said hoisting drum; a second internal ring gear rotatable with said traversing drum; a pinion engaging said first ring gear; planetary gearing having a first element and a second element; a lowering speed controlling device connecting said first element to said pinion; gear means connecting said second element to said second ring gear; gear shifting means selectively operable to connect either said electric motor or said manual driving means to said planetary gearing; mechanism selectively operable either to drivingly interconnect said elements to connect said drums for rotation as a unit or to hold said second element stationary to restrain movement of said traversing drum; solenoid means for selectively operating said mechanism; manual means for selectively operating said mechanism to connect said drums for operation as a unit; a brake normally engaging said speed controlling device to control the rate of lowering said hoisting device; manual means selectively operable to release said brake; and a centrifugal speed governor connected to said planetary gearing.

8. A hoist comprising, in combination, a frame; a hoisting drum rotatably mounted on said frame; a hoisting device including a pulley; a hoisting cable operatively connecting said drum to said hoisting device; power driving means operatively coupled to said hoisting drum; a spooling mechanism mounted on said frame and guiding said hoisting cable with respect to said hoisting drum; gearing connecting said spooling mechanism to said hoisting drum and effective to traverse said spooling mechanism with respect to said hoisting drum; pulley means mounted on said spooling mechanism and engaging said hoisting cable; and driving mechanism connecting said pulley means to said gearing to rotate said pulley means at a rate sufficient to maintain said hoisting cable taut with respect to said hoisting drum during lowering of said hoisting device in an unloaded condition.

9. A hoist comprising, in combination, a frame; a hoisting drum rotatably mounted on said frame; a hoisting device including a pulley; a hoisting cable operatively connecting said drum to said hoisting device; power driving means operatively coupled to said hoisting drum; a spooling mechanism mounted on said frame and guiding said hoisting cable with respect to said hoisting drum; gearing connecting said spooling mechanism to said hoisting drum and effective to traverse said spooling mechanism with respect to said hoisting drum; pulley means mounted on said spooling mechanism and engaging said hoisting cable; driving mechanism connecting said pulley means to said gearing to rotate said pulley means at a rate sufficient to maintain said hoisting cable taut with respect to said hoisting drum during lowering of said hoisting device in an unloaded condition; a ratchet device operative to disconnect said driving mechanism from said gearing during winding of said hoisting cable on said hoisting drum; and resilient means urging said pulley means into gripping engagement with said hoisting cable.

10. A traversing hoist comprising, in combination, a frame; a hoisting drum rotatably mounted on said frame; a traversing drum rotatably mounted on said frame; planetary gearing interconnecting said drums, said planetary gearing including a rotatable spider having a plurality of planetary pinions rotatably mounted thereon, a ring gear and a central pinion meshing with said planetary pinions; reduction gearing connecting said spider to said hoisting drum; power driving means; mechanism selectively operable to connect said power driving means to said reduction gearing; a shaft secured to said sun pinion; reduction gearing connecting said shaft to said traversing drum; a brake drum secured to said shaft; a first brake band arranged to grip said internal ring gear; a second brake band arranged to grip said brake drum; brake operating means interconnecting said brake bands for alternate operation; resilient means normally urging said second brake band into gripping relation with said brake drum to restrain movement of said traversing drum during a hoisting operation; and mechanism selectively operable to release said second brake band and urge said first brake band into gripping engagement with said ring gear to drivingly interconnect said drums for operation as a unit during a traversing operation.

11. A traversing hoist comprising, in combination, a frame; a hoisting drum rotatably mounted on said frame; a traversing drum rotatably mounted on said frame; planetary gearing interconnecting said drums, said planetary gearing including a rotatable spider having a plurality of planetary pinions rotatably mounted thereon, a ring gear and a central pinion meshing with said planetary pinions; reduction gearing connecting said spider to said hoisting drum; power driving means; mechanism selectively operable to connect said power driving means to said reduction gearing; a shaft secured to said sun pinion; reduction gearing connecting said shaft to said traversing drum; a brake drum secured to said shaft; a first brake band arranged to grip said internal ring gear; a second brake band arranged to grip said brake drum; brake operating means interconnecting said brake bands for alternate operation; resilient means normally urging said second brake band into gripping relation with said brake drum to restrain movement of said traversing drum during a hoisting operation; means selectively operable to release said second brake band and urge said first brake band into gripping engagement with said ring gear to drivingly interconnect said drums for operation as a unit during a traversing operation; and a solenoid mechanism and a manual mechanism each selectively operable to operate said selectively operable means to release said second brake band and urge said first brake band into gripping engagement with said ring gear to drivingly interconnect said drums for operation as a unit during a traversing operation; said manual mechanism including toggle means and an operating lever therefor pivotally connected to said frame.

12. A traversing hoist comprising, in combination, a frame; a hoisting drum rotatably mounted on said frame; a traversing drum rotatably mounted on said frame; planetary gearing interconnecting said drums, said planetary gearing including a rotatable spider having a plurality of planetary pinions rotatably mounted thereon, a ring gear and a central pinion meshing with said planetary pinions; reduction gearing connecting said spider to said hoisting drum; power driving means; manual driving means; gear shifting mechanism selectively operable to connect said power driving means or said manual driving means to said reduction gearing; a shaft secured to said sun pinion; reduction gearing connecting said shaft to said traversing drum; a brake drum secured to said shaft; a first brake band arranged to grip said internal ring gear; a second brake band arranged to grip said brake drum; brake operating means interconnecting said brake bands for alternate operation; resilient means normally urging said second brake band into gripping relation with said brake drum to restrain movement of said traversing drum during a hoisting operation; mechanism selectively operable to release said second brake band and urge said first brake band into gripping engagement with said ring gear to drivingly inter- connect said drums for operation as a unit during a traversing operation; said manual driving means including a driving shaft, a hook adapted to be engaged by a detachable crank and a torque limiting spring clutch interposed between said driving shaft and said hook.

13. A traversing hoist comprising, in combination, a frame; a hoisting drum rotatably mounted on said frame; a traversing drum rotatably mounted on said frame; a traversing device having a pulley thereon; a hoisting device including a pulley; an endless traversing cable passing around said traversing drum and secured to said traversing device; a hoisting cable secured at one end to said hoisting drum and at the other end to said traversing device, said hoisting cable passing around said pulley; an electric motor secured to said frame; planetary gearing interconnecting said drums; means selectively operable to connect said motor to said planetary gearing; mechanism operatively associated with said planetary gearing and effective to condition the same either to connect said drums for operation as a unit for traversing said traversing device or to hold said traversing drum stationary during vertical movement of said hoisting device; solenoid means for selectively operating said mechanism to connect said drums for operation as a unit; a source of electric current; relay means effective when energized to connect said motor only to said source of current; and remote control means for selectively energizing either said relay means alone, to effect vertical movement of said hoisting device, or said relay means and said solenoid means simultaneously, to effect movement of said traversing device while maintaining said hoisting device at a predetermined level with respect to said traversing drum.

14. A traversing hoist comprising, in combination, a hoisting drum; a traversing drum; a traversing device; a hoisting device mounted on said traversing device; cables connecting said hoisting and traversing drums to said hoisting and traversing devices, respectively; power driving means; manual driving means; planetary gearing interconnecting said drums; means selectively operable to connect either of said driving means to said planetary gearing; mechanism operatively associated with said planetary gearing and effective to condition the same either to interconnect said drums or to hold said traversing drum stationary; manual means for selectively operating said mechanism to connect said drums for operation as a unit; solenoid means for selectively operating said mechanism; a torque limiting mechanism interposed between said power driving means and said selectively operable means; and a torque limiting mechanism incorporated in said manual driving means.

WILLIAM P. LEAR.